United States Patent [19]  
Nakahara

[11] 3,959,623  
[45] May 25, 1976

[54] CARD CASSETTE
[75] Inventor: Kunihiko Nakahara, Shiojiri, Japan
[73] Assignee: Kabushiki Kaisha Sankyo Seiki Seisakusho, Japan
[22] Filed: Mar. 4, 1974
[21] Appl. No.: 447,634

[30] Foreign Application Priority Data
Mar. 8, 1973 Japan............................... 48-29003
Oct. 18, 1973 Japan.............................. 48-120333
Aug. 17, 1973 Japan............................... 48-96647
Apr. 10, 1973 Japan............................... 48-42985
Nov. 28, 1973 Japan.............................. 48-136155

[52] U.S. Cl. .......................... 235/61.11 R; 271/8 R; 271/164; 360/132
[51] Int. Cl.² ..................... G11B 15/29; G06K 7/08
[58] Field of Search ............. 235/61.11 R, 61.11 D, 235/61.11 E; 360/88, 95, 132, 133; 271/8 R, 145, 164, 272

[56] References Cited  
UNITED STATES PATENTS
3,630,518 12/1971 Street................................. 271/272
3,737,884 6/1973 Wallace....................... 235/61.11 D Primary Examiner—Vincent B. Canney  
Attorney, Agent, or Firm—McGlew and Tuttle

[57] ABSTRACT

A card cassette includes a card containing chamber, and a card feeding roller located on the wall of at least one side of the card containing chamber. When the cassette is inserted into a cassette mount or a cassette receiving recess of a mating device, the roller rolls on the inner wall of the cassette receiving recess of the device as the cassette is further pushed inward, thereby automatically delivering the card within the card containing chamber into a card processing station of the device. When the card cassette is withdrawn from the cassette receiving recess of the device, the roller rolls in the reverse direction, thereby automatically restoring the card into the chamber.

19 Claims, 20 Drawing Figures

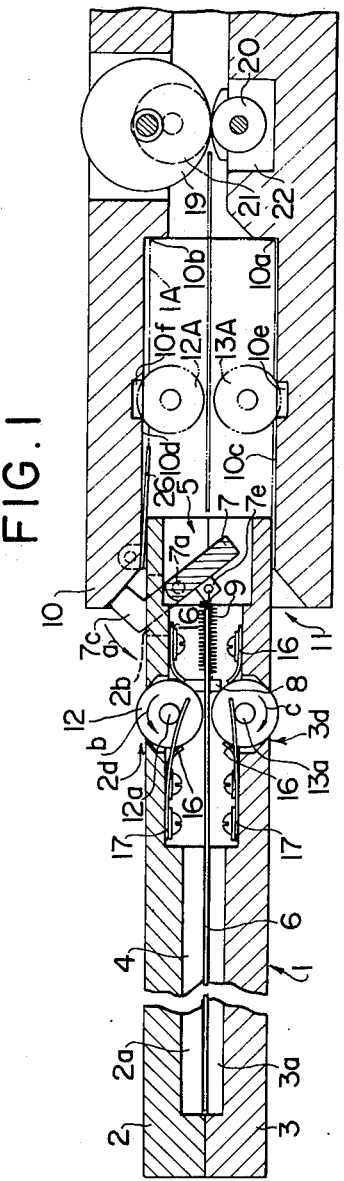
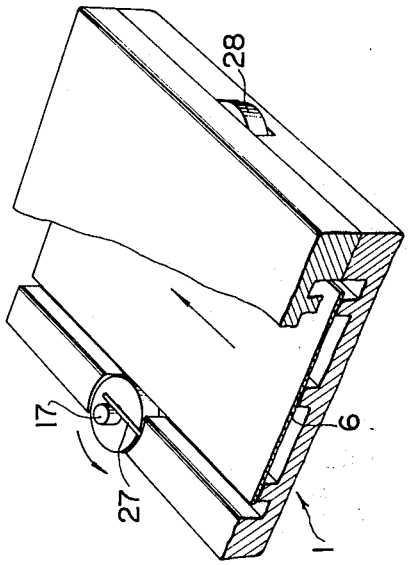
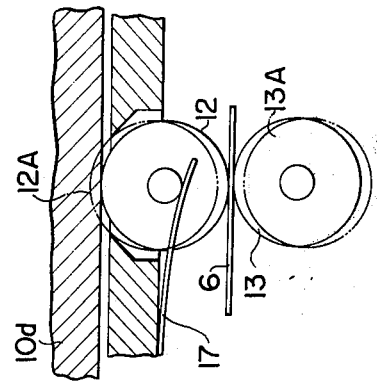

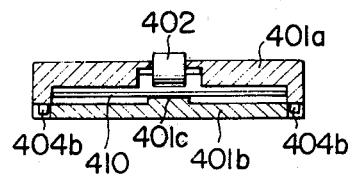
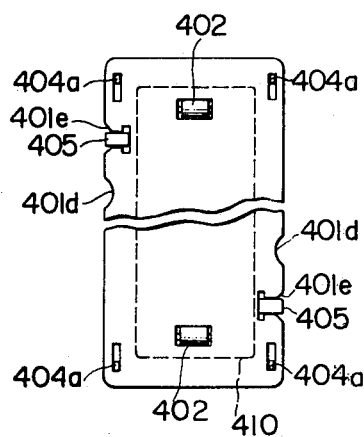
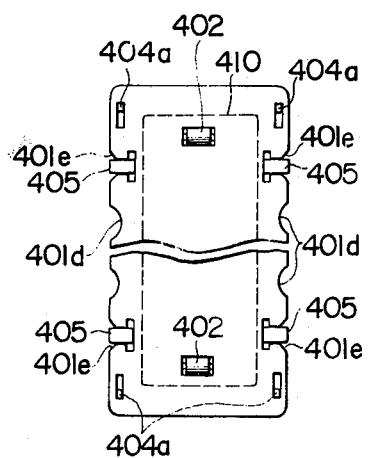

CARD CASSETTE

BACKGROUND OF THE INVENTION

The invention relates to a card cassette for use in a cassette handling device.

It is desirable that an information bearing card such as magnetic card, microfilm or punch card be contained in a protective case in order to avoid damage, abrasion or contamination by dust of the card, particularly where a semipermanent information storage is desired. However, it is very cumbersome to move the information bearing card out of and into the protective case each time it is used. It will be seen that it is convenient to receive the information bearing card within a cassette and to provide a cassette receiving recess in the device such as magnetic reader or optical reader which utilizes the card. Where such scheme is employed, there is a need on the part of the device to withdraw the information bearing card from the cassette into the device and to restore it from the device into the cassette automatically. In the prior art arrangement, there has been a complex mechanism required for this automation, which stood in the way to the implementation of such scheme. It may be also contemplated that a part of the information bearing card be normally exposed out of the cassette to facilitate its withdrawal, but this cannot completely prevent the possibility of damage to the card, which comprises the advantage of containing the card within a cassette.

SUMMARY OF THE INVENTION

It is an object of the invention to provide a cassette, functioning as a protective case for an information bearing card (hereinafter referred to as a card cassette), for use in a cassette handling device wherein the above difficulties are completely overcome by a sophisticated mounting of a card feeding roller so that the information bearing card be automatically moved out of and into the cassette as a result of the insertion and withdrawal operation of the card cassette with respect to the device.

In accordance with the invention, the card feeding roller rolls on the wall of the card receiving recess provided in the mating device as the card cassette is inserted into or withdrawn from the mating device, such rolling of the roller effectively and smoothly moving the card out of and into the cassette. The mechanism according to the invention is very simple in arrangement and accurate in operation, and permits the information bearing card to be completely contained within the cassette without causing a difficulty when it is to be withdrawn therefrom again. In accordance with another aspect of the invention, the card feeding roller is resiliently urged away from the information bearing card normally when the card is contained internally of the cassette and the latter is disengaged from the mating device, thereby sealing a slot in which the roller is mounted and thus preventing an ingress of dust therethrough. The resilience may also be utilized to control a positioning of the cassette when it is being inserted into the mating device.

BRIEF DESCRIPTION OF THE DRAWINGS

FIG. 1 is a cross section of the card cassette according to one embodiment of the invention as it engages the card receiving recess of the mating device;

FIG. 3 is a fragmentary side elevation, partly in section, of the card feeding rollers shown in FIG. 1;

FIG. 4 is a fragmentary side elevation, partially broken away, of the card cassette according to another embodiment of the invention;

FIG. 18 is a cross section taken along the line XVIII-XVIII shown in FIG. 15; and FIGS. 19 and 20 are plan views showing modified profiles of the cassette according to the invention.

DETAILED DESCRIPTION OF THE EMBODIMENTS

Figure 2:
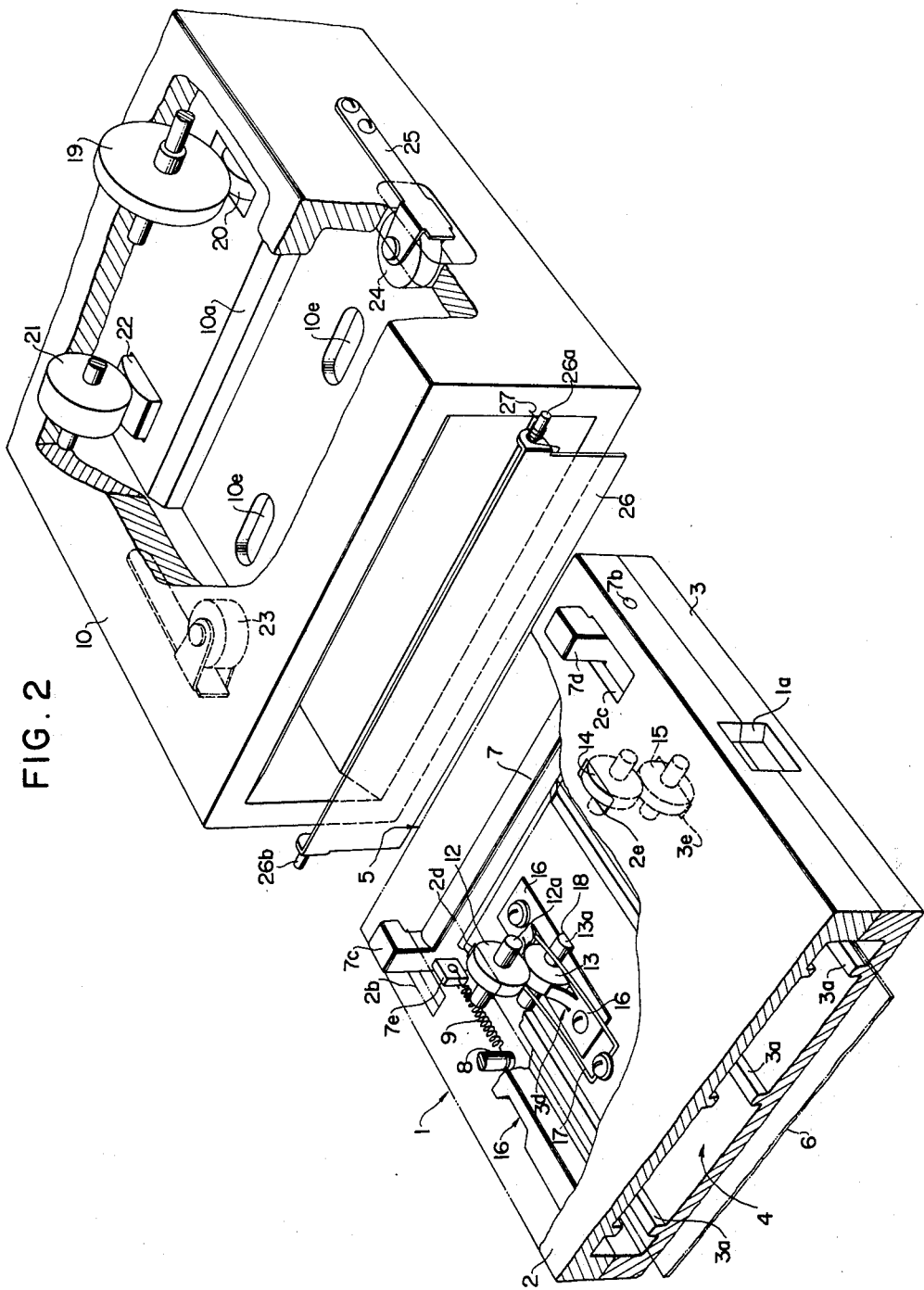
FIG. 2 is a perspective view, partially cut away, showing the card cassette and the mating device of FIG. 1 as separated from each other.

Referring to FIGS. 1 and 2, the cassette shown comprises a casing 1 which is formed by a pair of oppositely disposed, box-shaped casing halves 2, 3 which are secured together by machine screws or by welding to define a card containing chamber 4 internally. At its one end, the casing 1 is formed with a card access opening 5 which communicate with the card containing chamber 4. The inner wall of the casing halves 2, 3 which define the upper and lower surface of the card receiving chamber 4 are formed with several ribs 2a, 3a which extend lengthwise of an information bearing card 6 for properly holding the card in place within the card containing chamber 4. It will be appreciated that these ribs may be replaced by other projections having a smooth profile or by rollers which are spaced apart along the length of the card. In some instance, these ribs may be completely eliminated.

A lid 7 is rotatably disposed within the card access opening 5 by means of axles 7a, 7b which are attached to the opposite ends of the lid 7 and are pivotally mounted in the casing half 2. At its opposite ends, the lid 7 is also formed with a pair of arms 7c, 7d which extend through elongate slots 2b, 2c formed in the corresponding parts of the casing half 2 to project externally thereof. On one side of the lid 7 with respect to the pivot, the lid 7 is internally formed with a spring detent 7e, and a spring 9 extends between the detent 7e and a pin 8 fixedly mounted on the casing half 2 at a position displaced inwardly from the lid for urging the lid 7 to rotate so as to close the access opening. The lid 7 can be opened to receive the information bearing card 6 by causing either one or both of the arms 7c and 7d to rotate in the direction indicated by an arrow a in FIG. 1. It is to be understood that the lid 7 may have an alternative configuration and may be supported in other different manners than described above.

The card cassette 1 thus constructed is adapted to be inserted, with its card access opening 5 positioned foremost, into a card receiving recess 11 formed in a cassette mount 10 of a mating device such as a magnetic card reader, as indicated by phantom lines 1A in FIG. 1. In the course of such insertion, the arms 7c, 7d on the lid 7 abut against the wall of the card receiving recess 11 to be moved thereby into an open position in which the information bearing card 6 may be withdrawn from within the cassette. The final position which the card cassette 1 assumes within the card mount 10 may be determined by steps 10a, 10b formed therein, or alternatively may be determined by other means as will be described later.

In a region of the casing halves 2, 3 of the cassette 1 which is adapted to be inserted into the cassette mount 10, these casing halves are formed with roller mounting slots 2d, 3d, 2e, 3e adjacent to their lateral sides, and card feeding rollers 12, 13, 14, 15 are mounted in the respective slots. Each of the slots 2d, 3d, 2e, 3e is shown as tapering in an outward direction, but this is not essential.

As is clearly shown in FIG. 2, shield members 16 comprising felt or the like are secured by machine screws inside the respective slots 2d, 3d, 2e, 3e in order to prevent an ingress of dust, and a spring 17 having its one end secured to the top wall of the casing half 2 is associated with each slot so as to engage and urge the respective shafts 12a, 13a, 14a, 15a of the rollers 12, 13, 14, 15 in a direction away from the information bearing card 6. As will be noted in FIG. 2, the shaft 13a is rotatably supported by means of the spring 17 and a bearing recess 18 formed in the casing half 3. The other shafts 12a, 14a, 15a are similarly journaled.

When the card cassette 1 having card feeding rollers 12, 13, 14, 15 thus mounted thereon is inserted into the cassette mount 10 of a mating device, the respective rollers are forced by the walls 10c, 10d of the card receiving recess 11 to be displaced inwardly to engage the opposite surfaces of the information bearing card 6 within the card containing chamber 4, and rolls in the respective directions indicated by arrows b and c in FIG. 1 as a result of their frictional engagement with the walls of the recess 11, thereby delivering the information bearing card 6 through the access opening 5 to the exterior thereof. In FIG. 3, the position which the card feeding rollers 12, 13 assume when they are outwardly urged by the spring 17 is indicated by phantom lines 12A and 13A.

The wall of the cassette mount 10 of the mating device is formed with pairs of recesses 10e, 10f at a position corresponding to that which the card feeding rollers 12, 13 assume at the terminal position of the card cassette 1 inserted into the cassette mount 10. When the card cassette 1 is moved to such position, the both rollers 12, 13 move into the recesses 10e, 10f to release the information bearing card 6. The remaining card feeding rollers 14, 15 operate in a similar manner to release the information bearing card 6. It will be appreciated that such recess means may be used as positioning means for the card cassette 1.

When the card cassette 1 is inserted in place within the mount 10, the forward end of the information bearing card 6 has moved into the nip between a pair of feed rollers 19, 20 provided in the mount 10, and the rollers 19, 20 drive the card 6 inwardly of the device so as to bring it into abutment with a magnetic head 22 under the pressure applied by a pad roller 21 for reading the information thereon. It should be understood that the reader comprises a suitable type of unit which is adapted to read the information that is recorded on the card 6.

As indicated in FIG. 2, the lateral walls of the cassette which face the lateral sides of the cassette mount 10 when the cassette is inserted into the mount 10 are formed with a pair of notches 1a, 1b, respectively, in which are engaged by positioning rollers 23, 24. These rollers are carried movably by a pair of resilient supports 25 (only one being shown in FIG. 2) secured to the mount 10, and serve positioning the card cassette 1 at a given position 1A. Such positioning means may be eliminated by the functioning of the steps 10a, 10b, or the combination of the card feeding rollers and recesses 10e, 10f as mentioned previously.

As indicated in FIGS. 1 and 2, a cover member 26 may be rotatably disposed within the cassette inlet 11 as by pivotally mounting a pair of axles 26a, 26b extending from the opposite sides thereof in the wall of the cassette mount 10. The cover member 26 may be urged by a spring 27 to close the inlet normally, but may be rotated counter-clockwise, as viewed in FIG. 1, to permit the admission of the card cassette into the card mount 10.

In the embodiment described above, there are two pairs of card feeding rollers provided in the cassette. Alternatively, only one pair may be provided, one each on the respective sides of the card cassette as shown in FIG. 4. Referring to FIG. 4, a pair of card feeding rollers 27, 28 are provided in suitable slots formed in the lateral walls of the casing, and are urged outwardly by resilient means 17. It is to be understood that these rollers are journaled in a suitable manner in the wall of the respective slots. When the cassette is inserted into the cassette mount of the mating device, these rollers roll along the lateral walls of the cassette mount to deliver the card in the same manner as mentioned previously. It will be noted that when the card cassette 1 is withdrawn from the cassette mount 10, the card feeding rollers 12, 13, 14, 15 (in FIGS. 1 and 2) or 27, 28 (FIG. 4) roll in the opposite directions to return the information bearing card 6 into the cassette 1 in a simple manner.

Figure 5:
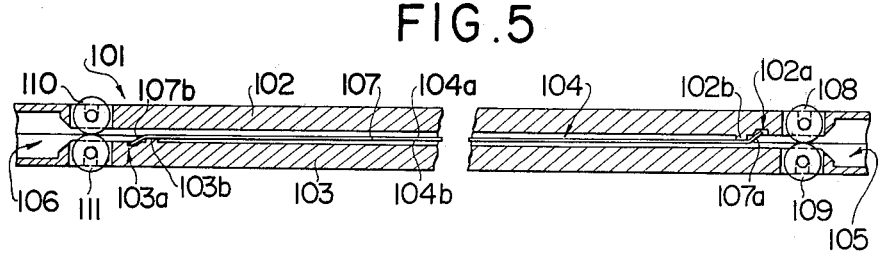
FIG. 5 is a cross section of the card cassette according to a further embodiment of the invention.
Figure 6:
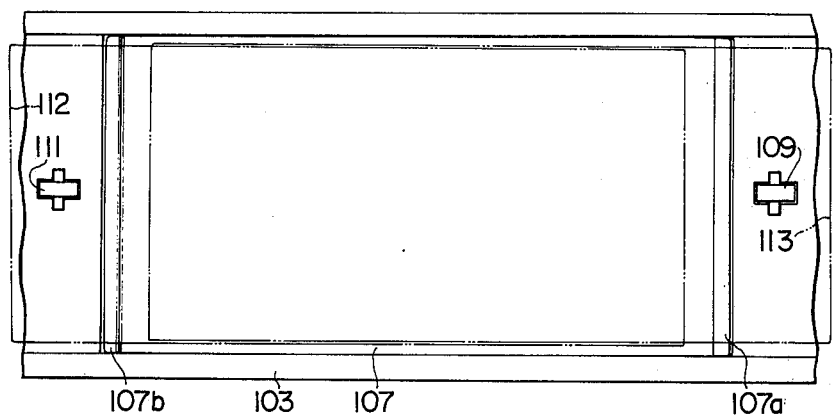
FIG. 6 is a plan view of the card cassette shown in FIG. 5 with one casing half removed.
Figure 7:
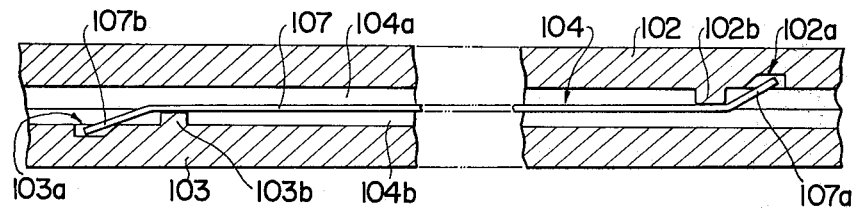
FIG. 7 is a fragmentary cross section, to an enlarged scale, of the card cassette shown in FIGS. 5 and 6.

Referring to FIG. 5, there is shown a card cassette 101 which comprises a pair of oppositely disposed, box-shaped casing halves 102, 103 which are secured with each other as by machine screws or by adhesion so as to define an empty chamber 104 internally. The cassette is also formed with a pair of card access openings 105, 106 at its opposite ends. Toward the card access opening 105, the upper casing half 102 is formed with a recess 102a and a projection 102b which is further spaced from the access opening than the recess 102a (see FIG. 7), and toward the access opening 106, the lower casing half 103 is similarly formed with a recess 103a and a projection 103b which is further removed from the access opening 106 than the recess 103a. A sheet member 107 is received within the empty chamber 104 and has its oppositely folded ends 107a, 107b fitted into the recesses 102a, 103a, respectively. The sheet member 107 serves as a partition in the empty chamber 104 to form a pair of card containing chambers 104a and 104b, one of the card containing chambers, 104a, communicating with the access opening 106 while the other card containing chamber 104b communicating with the access opening 105. The projections 102b and 103b define the terminal end of the respective card containing chambers 104a and 104b, respectively. Card feeding rollers 108, 109, 110, 111 (FIGS. 5 and 6) are mounted in the respective end portions of the cassette 101 at a position outward of the respective card containing chambers, in the similar manner as mentioned previously in connection with the card feeding rollers 12 and 13.

A pair of information bearing cards 112, 113 (see FIG. 6) are contained within the respective card containing chambers 104a and 104b of the card cassette 101, and are adapted to be withdrawn therefrom or returned thereinto through the card access opening 106 or 105, respectively. Such withdrawal or returning motion of the information bearing cards are similar to that described in connection with the card cassette shown in FIGS. 1 to 3, and therefore will not be described any further.

It will be appreciated that lids similar to the lid 7 mentioned in connection with FIG. 1 may be provided within the respective card access openings 105 and 106. In a specific example, the thickness of the sheet member 107 measured 0.2 mm, the internal height of the both card containing chambers 104a and 104b measured 0.5 mm, and the total thickness was only 9.6 mm, resulting in a very compact cassette capable of containing two cards. The sheet member 107 may be a simple partition or may comprise a resilient plate. In either instance, the sheet member 107 may be mounted in any other desired manner.

Figure 8:
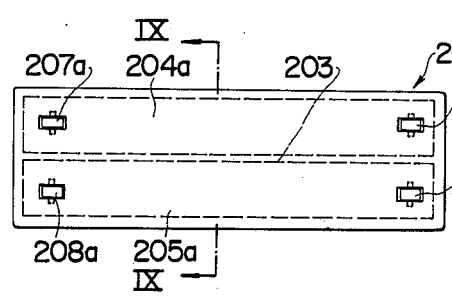
FIG. 8 is a side elevation of the card cassette according to still another embodiment of the invention.
Figure 9:
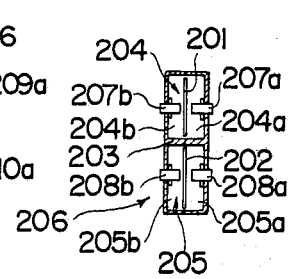
FIG. 9 is a cross section taken along the line IX-IX shown in FIG. 8.
Figure 10:
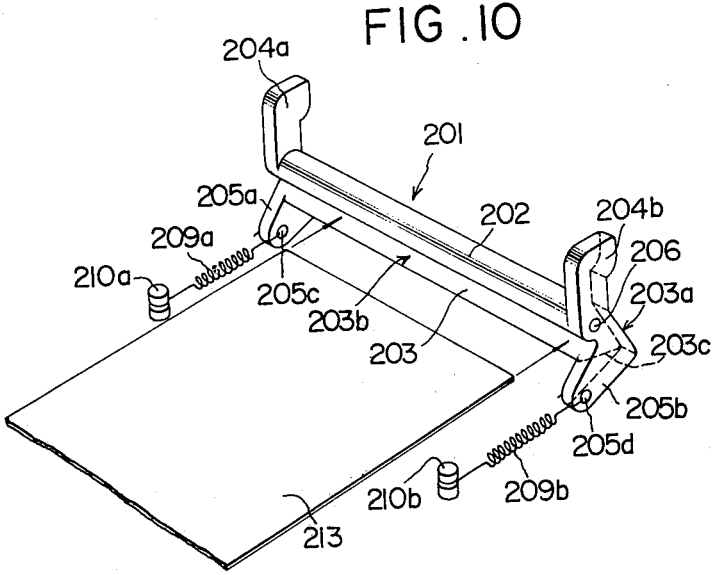
FIG. 10 is a perspective view of the card cassette according to an additional embodiment of the invention.
Figure 11:
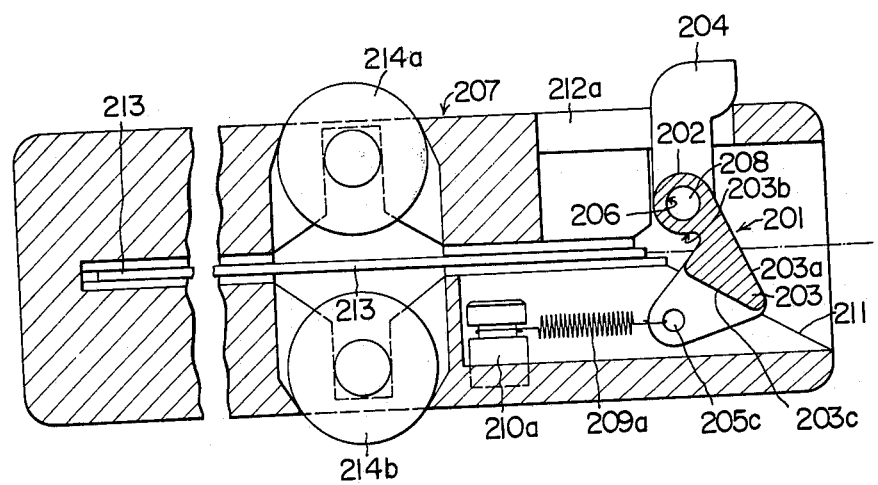
FIG. 11 is a cross section of the card cassette shown in FIG. 10, showing the feeding rollers in greater detail.

FIGS. 8 and 9 show a card cassette 206 capable of containing four information bearing cards. Specifically, the cassette 206 is divided by a longitudinally extending wall 203 into a pair of empty chambers 204 and 205, each of which is partitioned by respective sheet members 201 and 202 to define closely adjacent card containing chambers 204a, 204b, 205a, 205b. The card cassette 206 also includes card feeding rollers 207a, 207b, 208a, 208b as well as card feeding rollers 209a, 210a (their corresponding rollers are not shown), which are mounted in a portion of the respective containing chambers which engages the wall of the cassette mount of the mating device, in a similar manner as the mounting of the card feeding rollers 12 and 13. All of these rollers 207 to 210 operate in the similar manner as the latter. Latter, even though a single roller acts on the card in the respective chamber at each end of the cassette in contradistinction to feeding the card by a pair of rollers located on opposite sides thereof as indicated in the preceding embodiments. However, such a single roller feed can advantageously be employed as will be described more fully later in connection with the embodiments shown in FIGS. 15 and 16. It will of course be appreciated that the respective cards in the embodiment of FIGS. 8 and 9 may be engaged by a pair of rollers as before. This represents a doubling of the structure shown in FIG. 5. In a similar manner, a card cassette capable of containing a multiplicity of information bearing cards may be constructed. The number of card feeding rollers may be suitably chosen, and the information bearing card which is contained in the cassette may be recorded on either one or both surfaces thereof.

FIGS. 10 to 13 show a configuration of the lid of the card cassette according to the invention which is designed to prevent an unintended withdrawal of the card. A cassette 207 includes a lid 201 which comprising an upper, cylindrical post 202 and a lower, triangular prism 203 integrally joined therewith. At its opposite lateral ends, the lid includes a pair of upwardly extending arms 204a, 204b and a pair of downwardly and inwardly extending pawls 205a, 205b, and is also formed with axially extending blind bores 206 in its end faces. Portion of the periphery of the cylindrical post 202 which faces the exterior of the cassette is contiguous with the outer side of the triangular prism 203 to define an outer lid surface 203a, while portion of the periphery of the cylindrical post which is located inwardly extends counter-clockwise, as viewed in FIG. 11, to a location where it extends in a horizontal direction, and is thereafter inverted to form a recessed groove 203b before continueing to the inner side of the triangular prism 203 to define an inner lid surface 203c.

The cassette 207 includes a pair of aligned pivots 208 which fit in the bores 206 of the lid 201, thereby supporting the latter in a rotatable manner. The pawls 205a and 205b have holes 205c and 205d formed therein, into which is hooked one end of springs 209a, 209b, the other end of which engage stationary pins 210a, 210b fixed to the casing, the springs 209 thus urging the lid 201 to rotate clockwise. As a result of such resilient bias, the inner surface 203c of the lid is tightly held against a ramp surface 211 formed on the cassette, thus closing the access opening thereof. Under this condition, the top end of the arms 204a, 204b projects through windows 212a, 212b (the latter being not shown) formed in the top wall of the cassette, and the recessed groove 203b in the lid is located at the same level as a card 213.

The lid 201 operates as follows:

When the exposed top portions of the feed rollers 214a, 214b are engaged by the surfaces of another article to be forced inwardly during the handling of the cassette as when it is being conveyed, they will be moved inwardly into contact with the card 213 and tend to displace it toward the access opening. However, the forward edge of the card will bear against the recessed groove 203b, and further displacement of the card will cause it to curve in an upward direction, thereby preventing the withdrawal of the card by means of the recessed groove 203b. While the force applied to the card 213 will tend to open the lid 201 against the resilience applied by the springs 209a, 209b, a short distance of the arm of moment defined between the point of engagement of the card 213 with the lid and the axis of rotation of the latter is insufficient to provide a torque of enough magnitude to overcome the bias applied by the springs 209a, 209b, thus maintaining the lid 213 closed.

Figure 12:
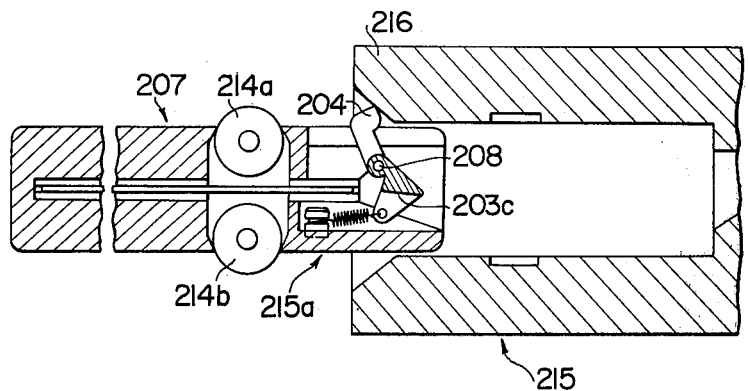
FIGS. 12 and 13 are schematic cross sections illustrating the operational relationship between the card cassette shown in FIGS. 10 and 11 and a reader.
Figure 13:
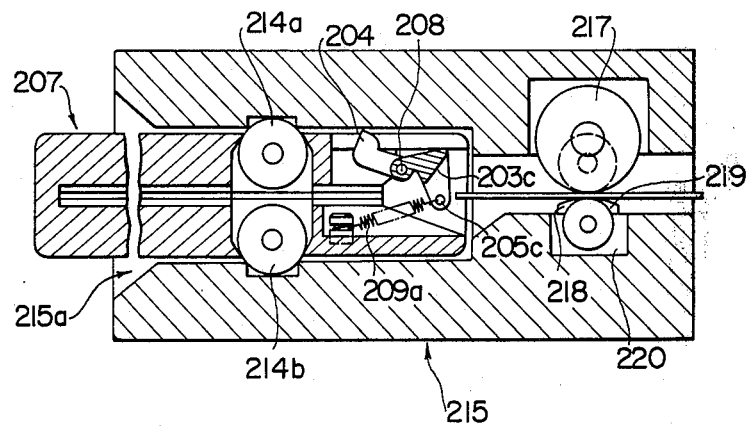

When reading the card, the forward portion of the cassette 207 is inserted into a cassette inlet 215a (see FIG. 12) of a mating device, for example, a card reader 215, whereupon the arms 204a 204b will be brought into abutment against the top wall 216 of the cassette inlet 215a, which causes the lid 201 to rotate counter-clockwise against the resilient bias applied thereto in a closing direction, and to move it to a position in which the inner surface 203c is positioned horizontal, thus opening the card passage (see FIG. 12).

Further movement of the card cassette 207 into the mating device causes the feed rollers 214a, 214b to engage and roll on the inner wall of the cassette mount, thereby advancing the card 213. When the forward edge of the card reaches the nip defined between a capstan roller 217 and a pinch roller 218, it continues to be fed by these rollers while being held in abutment against a magnetic head 220 under pressure supplied by means of a pad roller 219 for the purpose of magnetic recording or reading. Toward the end of such processing, the card 213 has been completely withdrawn from the cassette 207.

Upon termination of the processing such as card reading, the both rollers 217 and 218 are rotated in the opposite directions, whereby the trailing end of the card 213 is returned into the cassette 207. At this time, the card 213 is guided by the inner lid surface 203c, which assures a smooth introduction of the card into the cassette 207. During subsequent withdrawal of the cassette 207 from the reader 215, the feed rollers 214a, 214b now roll in the opposite directions, whereby the entire card is returned into the cassette 207.

Figure 14:
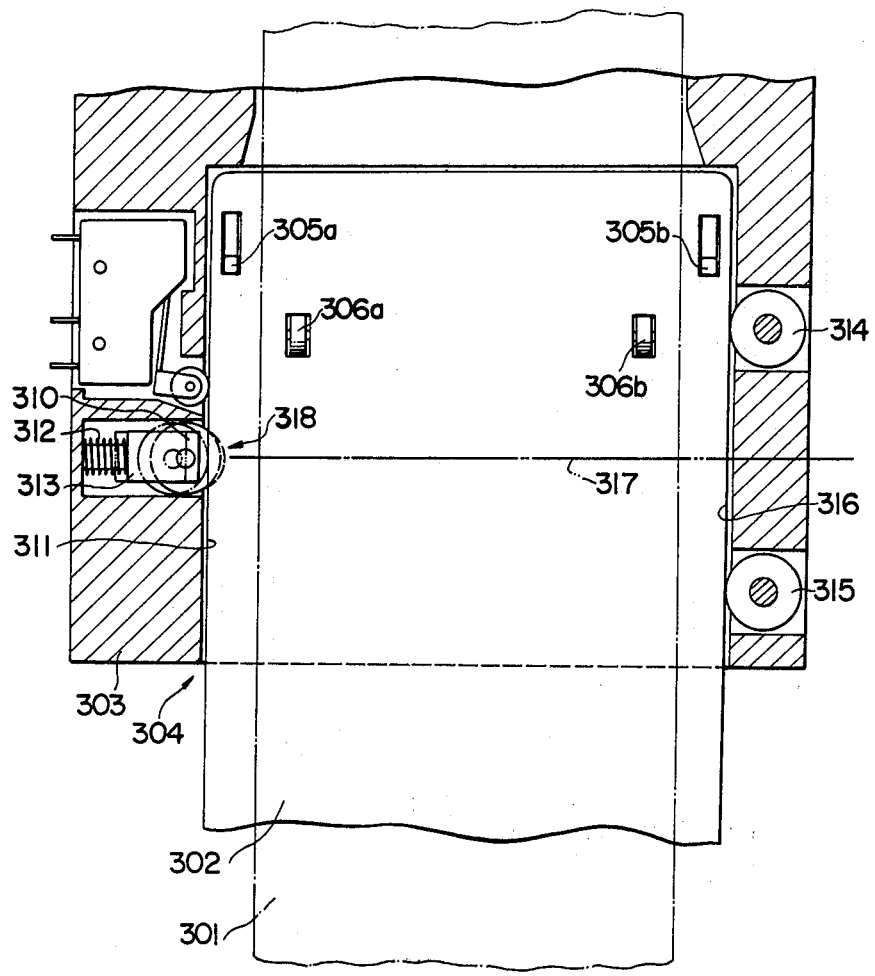
FIG. 14 is a horizontal cross section showing another manner of locating the card cassette according to the invention in place within a mating device.

FIG. 14 shows one example of means for positively positioning a card cassette 302 within a mating device. A magnetic card 301 is contained within the cassette 302. When the cassette 302 is inserted into a cassette mount 304 of a magnetic recorder 303, arms 305a, 305b are operated to open the lid, and the rolling motion of feed rollers 306a, 306b causes the card 301 to be delivered into the device 303. All of these operations are similar to those mentioned previously.

A pressure roller 310 is rotatably journaled in a bearing 313 which is received within the wall of the device 303 and is urged by a spring 312 to move toward the interior of the device 303 so that part of the periphery of the roller 310 projects beyond the inner wall 311. A pair of rollers 314, 315 are rotatably journaled within the wall of the device 303 which is opposite to the wall 311 for receiving the cassette 302 as it is urged toward them by the roller 310 under the action of the spring 312. It is preferred that the rollers 314, 315 have their periphery slightly projecting from the inner surface of the wall 316. It is desirable that the rollers 314 and 315 are spaced by an equal distance from the line of an action 317 along which the cassette 302 is urged by the roller 310. Such an arrangement of holding the cassette 302 at three points located at the apices of a triangle assures a correct positioning and facilitates the insertion of the cassette. The accuracy of positioning the cassette 302 can be further improved by providing a recess 318, indicated by phantom lines, in the side of the cassette 302 which faces and engages the roller 310.

Figure 15:
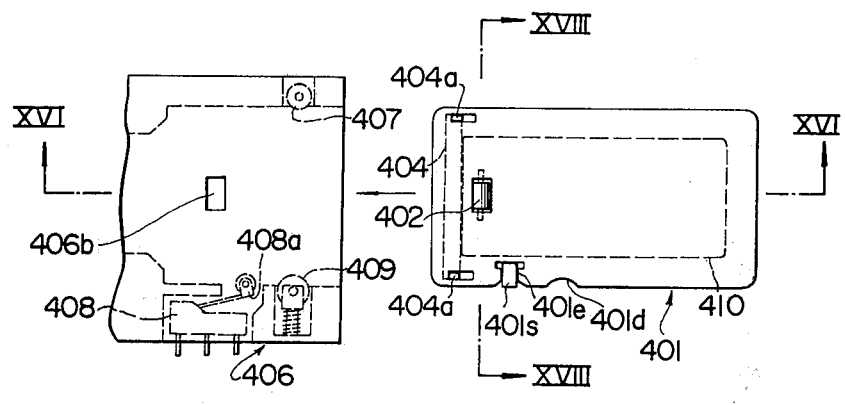
FIG. 15 is a plan view of the card cassette according to a still additional embodiment of the invention in conjunction with a recorder, the latter being shown only in its portion including a guide recess.
Figure 16:
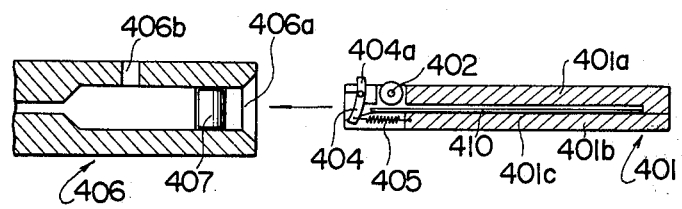
FIG. 16 is a cross section taken along the line XVI-XVI shown in FIG. 15.
Figure 17:
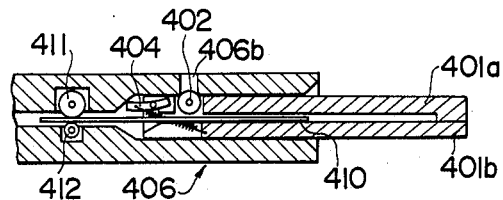
FIG. 17 is a cross section showing the card cassette engaged in the recorder.

FIGS. 15 to 20 show several embodiments wherein feed rollers are located on only one side of the cassette. Referring to FIGS. 15 and 16, a card 410 is contained within a cassette 401 which comprises an upper frame 401a and a lower frame 401b. A card feeding roller 402 is rotatably mounted within the upper frame 401a of the cassette 401 and is urged by suitable means to assume a raised position. As a result, the roller 402 is removed from the card 410, and has its periphery partially projecting to the exterior of the frame 401a. A lid 404 is rockably mounted within the card access opening of the cassette 401 and is urged to assume a closed position by means of a spring 405. At its opposite ends, the lid 404 includes a pair of arms 404a, 404b (404b being not shown) which projects through the upper frame 401a, and the arrangement is such that as the cassette 401 is inserted into a recording and play-back unit 406, the arms 404a, 404b abut against the wall of a cassette inlet to open the lid 404. As the cassette 401 continues to be inserted, the feed roller 402 rolls on the inner wall surface of the unit 406 as a result of frictional engagement therewith, thereby moving into engagement with the card 401 to delivery it into the unit 406. At this time, the card 410 slides on a card guide surface 401c which is formed on the lower frame 401b.

Along its one lateral side, the cassette 401 is formed with a notch 401d which may be engaged by a positioning roller 409, and also with a groove 401e into which a recording preventing leaf spring 401s may be attached. In the absence of the leaf spring 401s, a microswitch 408 provided on the unit 406 has its actuator 408a engaged with the groove 401e, thereby operating the switch 408 to enable a recording operation. In the presence of the leaf spring 401s, the actuator 408a remains stationary unit the card has moved past it, so that a recording operation cannot be performed. When the cassette 401 has been inserted to a given position (see FIG. 17), the roller 402 engages a slot 406b formed in the unit 406, thereby moving away from the card 410. A roller 409 provided within the unit 406 fits into the notch 401d formed in the cassette 401, thereby positioning the latter. Upon termination of the insertion of the cassette 401, the card 410 is conveyed to a processing station by the rotation of a capstan roller 411 and a pinch roller 412 for the purpose of reading or recording operation. When the processing has been completed, the card 401 is returned into the cassette 401 by the reverse rotation of the rollers 411 and 412, whereupon the cassette 401 may be withdrawn from the unit 406 to contain the card 410 completely within it.

The described arrangement permits a card feeding operation in a satisfactory manner with a single roller located only on one side of the cassette with consequent advantages of simplified construction and assembly, reduced parts required and providing a compact structure having a reduced thickness while improving the problem of misalignment. The reduced thickness of the cassette is advantageous for its mailing purpose. It is preferred that portion of the card which bears against the roller or the guide surface be clear of information record. While in the above embodiments, the card comprises an information track on its one or both surfaces which can be used during its movement in one direction only, a card having tracks on its one or both surfaces which are capable of being recorded during the movement in both directions can be obtained by using a symmetrical arrangement at both longitudinal ends as well as on both lateral sides (see FIGS. 19 and 20). It will be also appreciated that a card having information tracks all over its surface can be constructed. While not shown, the card feeding roller or rollers may be located along the lateral side of the card rather than bearing against the major surface of the card.

What is claimed is:

1. A card cassette for use with a cassette mount having an interior wall enclosing a cassette receiving chamber, comprising a case having interior walls defining a card containing chamber for containing a card that is to be used to record information and to play back information therefrom, a card access opening communicating with said card containing chamber, said walls having a feed roller mounting slot, a feed roller rotatably mounted on said walls and extending within the feed roller mounting slot, bias means urging the card feed roller in an outward direction away from any card within the card receiving chamber into a position at which at least a part of its periphery projects through the slot and exteriorly of said cassette, said feed roller being brought into abutment against the interior walls of the cassette mount when introduced therein to be forced inwardly against said bias means into engagement with the card within said card containing chamber, said feed roller being rollable on the interior walls of the cassette mount as the cassette is further inserted therein to rotate the said feed roller in a forward feed direction and thereby deliver the card further within the cassette receiving chamber, said feed roller being rollable on the interior walls of the cassette mount in an opposite direction when the cassette is withdrawn from the cassette mount to thereby return the card into the card-receiving chamber of said cassette mount.

2. A card cassette according to claim 1 in which the roller mounting slot is formed in one of the upper and lower walls of the cassette, the other of which is formed with a card guide surface.

3. A card cassette according to claim 1, including a pair of roller mounting slots which are formed in a pair of oppositely located walls of the cassette and are aligned with each other, and a pair of feed rollers mounted in the pair of roller mounting slots.

4. A card cassette according to claim 3 in which the roller mounting slots are formed in the upper and lower walls of the cassette at positions opposing to each other.

5. A card cassette according to claim 3 in which the roller mounting slots are formed in the lateral walls of the cassette at positions opposing to each other.

6. A card cassette according to claim 1 in which the roller mounting slot is tapered outwardly and is normally closed by the feed roller under the action of said bias means.

7. A card cassette according to claim 1 in which a flexible shield member is disposed adjacent to the feed roller to seal the roller mounting slot.

8. A card cassette according to claim 1, further including a recess which is adapted to be engaged by a positioning roller located in the mating device.

9. A card cassette according to claim 1, further including a lid disposed within the card access opening, the lid including an arm which projects externally through the wall of the cassette to be operated for opening or closing the lid.

10. A card cassette according to claim 9 in which the lid includes a recessed groove which prevents withdrawal of a card when the lid is closed, and an inner surface along which a card can be introduced from the exterior when the lid is open.

11. A card cassette according to claim 1 in which the card containing chamber comprises a pair of upper and lower sub-chambers, the respective card containing sub-chambers being associated with card access openings which are located at the opposite ends of the cassette.

12. A card cassette according to claim 11 in which the card containing sub-chambers are defined by a single partition member which extends longitudinally of the cassette and closes the respective sub-chambers with its folded ends.

13. A card cassette according to claim 11 in which each of the sub-chambers is additionally divided into two sections crosswise of the cassette.

14. A card cassette according to claim 1 in which the card feed roller falls into a recess formed in an inner wall of the mating device under the action of the bias means to release a card within the cassette when the latter has been inserted to a given position within the cassette mount of the mating device.

15. A card cassette according to claim 1 in which when the cassette is inserted into the cassette mount of the mating device, it is adapted to be held sandwiched between a single roller located in the cassette mount on one side thereof and a pair of rollers located in the cassette mount on the other side thereof, said single roller and said pair of rollers being located at the apices of an imaginary isosceles triangle in which the pair of rollers are on the base thereof, either said single roller or said pair of rollers being resiliently urged against the cassette.

16. A card cassette according to claim 15 in which recess means is formed in a side thereof for engagement with either said single roller or said pair of rollers.

17. A card cassette according to claim 1, including a cassette mount having an end wall with an opening therein leading into an interior magnetic head chamber, a magnetic head positioned in said chamber at a spaced location from the entrance opening, feed roller means adjacent said magnetic head, said feed roller means being engageable with a card which is fed by said feed roller of said cassette during its insertion into the entrance opening of said cassette mount.

18. A card cassette according to claim 1, including a lid pivotally mounted in the access opening of said cassette, said lid having arms projecting outwardly through the top of said cassette and being engageable upon introduction into the opening of said cassette mount to rotate said lid to an open position opening the access opening, and means biasing said lid to a closing position to close said lid when it is removed from said cassette mount, said feed roller means in said cassette mount including a pad roller overlying said head and having a portion extending through the top of said cassette mount, said feed roller means also including a second set of feed rollers aligned with said magnetic head, said second set of feed rollers including an upper feed roller extending through a slot of said cassette and being accessible to the exterior thereof.

19. A cassette mount for a card cassette comprising a housing having an end wall with an entrance opening leading into an interior magnetic head chamber, a magnetic head mounted in the walls of said housing and projecting into said chamber adjacent the inner end thereof, feed roller means associated with said magnetic head for engaging a card and positioning it in respect to said magnetic head, said housing having camming walls adjacent the entrance thereof and extending along the interior magnetic head chamber for engaging and compressing feed rollers of a cassette to be inserted into the cassette mount for effecting the feeding of cards out of the cassette during its insertion into the entrance opening and for positioning them in association with said feed roller means of said mount.

* * * * *